United States Patent Office
2,992,190
Patented July 11, 1961

2,992,190
OLEFIN POLYMERIZATION CATALYST
John MacMillan Bruce, Jr., Wilmington, Del., assignor to
E. I. du Pont de Nemours and Company, Wilmington,
Del., a corporation of Delaware
No Drawing. Filed Sept. 13, 1957, Ser. No. 683,707
3 Claims. (Cl. 252—429)

This invention relates to the polymerization of ethylenically unsaturated hydrocarbons, and especially to the polymerization of ethylene.

It has recently been discovered that ethylene can be polymerized to high density, linear polymers at relatively low pressures by employing a catalyst system comprising a metal complex containing a transition metal in a reduced valence state. This complex is obtained by admixing a salt or alcoholate, preferably a halide, of a metal selected from metals forming groups IV–B, V–B and VI–B of the periodic table of elements, with a reducing agent. Reducing agents capable of reducing the transition metals to the catalytically active state are organometallic compounds such as metal alkyls and aryls, metal hydrides, and certain active metals such as alkali metals. This type of catalyst has been referred to as a coordination catalyst, since it is believed that the polymerization of ethylenically unsaturated monomer proceeds through the formation of a coordinate bond between the reduced metal in the complex and the monomer. This catalyst system has, furthermore, been found highly useful in polymerizing α-olefins such as propylene to high molecular weight solid polymers.

The objects of the present invention are to improve the efficiency and activity of such coordination catalysts involving a reduced transition metal.

It has now been discovered, in accordance with the present invention, that the activity of organometallic catalysts for polymerization of terminally unsaturated hydrocarbon monomers is surprisingly increased by the addition of lead tetraalkyls to catalyst components comprising a polyvalent metal halide, wherein the metal is an element of group IV–B of the periodic table and an organometallic aluminum compound.

In the polymerization of ethylene employing coordination catalysts generally, e.g., a catalyst obtained by the reduction of a titanium or similar transition metal compound, it was found that organometallic aluminum compounds wherein the aluminum is bonded to three hydrocarbon radicals are very active reducing agents. Lead tetraalkyls on the other hand were found to be reducing agents which lead to the formation of catalysts of much lower activity and which at lower temperatures exhibit essentially no polymer forming catalytic activity. The use of a combination of an aluminum trihydrocarbon compound and a lead tetraalkyl was discovered to give rise to a polymerization catalyst which not merely reflects the additive effect of the two organometallic compounds, but, instead, shows the result of synergism between the aluminum trihydrocarbon compound and the lead tetraalkyl.

The transition metal halides employed in the catalyst of the present invention are the halides of metals of group IV–B of the periodic table of elements (as disclosed on page 392 of the 37th edition of "Handbook of Chemistry and Physics") and, as such, include the halides of Ti, Zr and Hf of which titanium halides are preferred. The halides included are chlorides, oxychlorides, bromides, iodides and fluorides, the latter two, however, being less preferred than the chlorides and bromides. Those halides which are soluble in hydrocarbon solvents in the quantities required for polymerization, such as titanium tetrachloride, are particularly preferred since with soluble halides the reduction to the catalytically active state is more readily achieved.

The reducing agents employed to form the catalyst of the present invention are combinations of aluminum trihydrocarbon compounds and lead tetraalkyls. The aluminum trihydrocarbon compounds may be represented by the general formula $AlR_3$ wherein R is a hydrocarbon radical. The term hydrocarbon radical includes aliphatic, unsaturated aliphatic, cyclo-aliphatic, aromatic and mixed aromatic and aliphatic hydrocarbon radicals wherein the radicals consist essentially solely of carbon and hydrogen. Representative examples of aluminum trihydrocarbon compounds that can be employed in the present invention are such compounds as aluminum trimethyl, aluminum triethyl, aluminum tripropyl, aluminum triisobutyl, aluminum trioctyl, aluminum tridodecyl, aluminum tricyclohexenyl - ethyl, aluminum trisdihydromyrcenyl, aluminum triphenyl, aluminum trisdihydrobutadienyl, aluminum trisdihydrovinylbenzyl and mixtures thereof. The lead tetraalkyls employed in the present invention include such compounds as lead tetraethyl, lead tetrabutyl, lead tetrapentyl, etc.

The preparation of aluminum trialkyls is well known in the art and other aluminum trihydrocarbon compounds may be prepared by similar techniques. The preparation of lead tetraalkyls is also known in the art.

The catalyst of the present invention may be formed in various ways. It is possible to admix the catalyst components in a prior separate step, or it is possible to admix the components in the presence of the monomer. Generally, the catalyst components are admixed in the presence of a liquid diluent which can also serve as the polymerization medium and in which the individual catalyst components are soluble. This liquid diluent may be an inert hydrocarbon solvent or a liquid monomer. The catalyst components, particularly the transition metal halides, are reacted with the reducing agents in the form of a solution to obtain maximum activity of the resulting catalyst complex. The order in which the catalyst components are admixed is not critical. The ratio of the reducing agents to the transition metal halides employed in the formation of the catalysts of the present invention can be greatly varied but should be sufficient to reduce the transition metal to a valence state below three. In general, the highest activity of the catalyst is obtained when a molar ratio of reducing agent to transition metal halide ranging from 0.3 to 10 is employed. The ratio of the two reducing components, i.e., the aluminum trihydrocarbon compound and the lead tetraalkyl may be varied from a high proportion of the aluminum trihydrocarbon compound to a high proportion of the lead tetraalkyl. However, since the aluminum trihydrocarbon compounds are reducing agents, which result in catalyst systems significantly more active than catalyst systems obtained with lead tetraalkyls, it is preferred to employ significant quantities of aluminum trihydrocarbons in the formation of the catalyst.

The catalytically active species is formed on admixing the catalyst components; as stated hereinabove the catalyst may be formed at room temperature or may be admixed at elevated temperatures. In general, it is preferred to use slightly elevated temperatures, since at such temperatures the reduction of the transition metal halide is facilitated. The reduction is furthermore carried out in the substantial absence of oxygen, moisture and hydroxyl group containing compounds, since such compounds tend to attack and destroy organometallic bonds which are necessary to the formation of the catalytically active species.

The quantity of the active catalyst should be sufficient to give rise to a desirable polymerization rate. Quantities generally employed range from 0.001 to 10% by weight of the monomer.

The extreme activity of the catalyst of the present invention makes a versatile polymerization process possible. Generally the polymerization of ethylene, in accordance with the present invention, is carried out in the presence of a diluent. Suitable diluents are inert hydrocarbon solvents such as cyclohexane, decane, xylene and toluene. Where the monomer is liquid as polymerization conditions, the monomer itself may be used as the diluent. The reaction temperature may be varied from below 0° to temperatures above 300° C., the preferred range being from room temperature to 250° C. Pressures also may be varied over a wide range, but are preferably within a range of 1 to 200 atmospheres. The process of the present invention may be carried out in batch or continuous operation.

The synergistic catalytic effect obtained from the combination of aluminum trihydrocarbons and lead tetraalkyls is further illustrated by the following examples:

*Example 1*

Into a 500 ml. flask equipped with stirrer, condenser and gas inlet and outlet means was charged under an atmosphere of ethylene 100 ml. of decahydronaphthalene. The reactants were agitated and heated to 110° C. The quantity of titanium tetrachloride set forth in the table below was injected into the reaction medium. This was followed by the injection of aluminum triisobutyl and lead tetraalkyl in quantities set forth below. The ethylene pressure and temperature were carefully maintained at 1 atmosphere and 110° C. respectively. The amount of ethylene added to the reaction system was measured at regular time intervals. The polymerization was stopped after 120 minutes of continuous agitation. The reaction mixture was cooled to room temperature and poured into an excess quantity of methanol. A white, solid polymer of ethylene was obtained. The experiment was repeated employing titanium tetrachloride with aluminum triisobutyl, and titanium tetrachloride with lead tetraethyl as the catalyst components for the polymerization. The following results were obtained:

| Catalyst Components | Quantity in Micromoles | Ethylene Polymerized After— | |
|---|---|---|---|
| | | 10 Mins. | 110 Mins. |
| | | $Cm.^3$ | $Cm.^3$ |
| Titanium tetrachloride | 32 | 1,000 | 2,430 |
| Aluminum triisobutyl | 115 | | |
| Lead tetraethyl | 128 | | |
| Titanium tetrachloride | 32 | 720 | 2,090 |
| Aluminum triisobutyl | 115 | | |
| Titanium tetrachloride | 32 | No measurable quantities polymerized | |
| Lead tetraethyl | 256 | | |

*Example II*

Employing the polymerization procedure of Example I with aluminum tridihydromyrcenyl, titanium tetrachloride and lead tetraethyl, the following results were obtained:

| Catalyst Components | Quantity in Micromoles | Ethylene Polymerized After 120 Mins. |
|---|---|---|
| Titanium tetrachloride | 32 | 2,190 $cm.^3$ |
| Aluminum trisdihydromyrcenyl | 100 | |
| Lead tetraethyl | 128 | |
| Titanium tetrachloride | 32 | 1,775 $cm.^3$ |
| Aluminum trisdihydromyrcenyl | 100 | |
| Titanium tetrachloride | 32 | No measurable quantities polymerized. |
| Lead tetraethyl | 256 | |

The initial rate of ethylene absorbed in the polymerization run employing the synergistic pair of reducing agents was 92.5 $cm.^3$/min. The initial rate of ethylene absorption employing aluminum trisdihydromyrcenyl was 57.5 $cm.^3$/min.

The examples have illustrated the synergistic increase in catalytic activity obtained by employing an aluminum trihydrocarbon compound in combination with a lead tetraalkyl. The synergistic effect of employing these two reducing agents is also observed in large scale polymerizations although it is exceedingly more difficult to obtain reproducible measurements of catalyst activity. Thus for purposes of illustration, the examples have been limited to small scale polymerizations. It is to be understood that the foregoing examples are illustrative only, and that numerous embodiments of the invention will occur to those skilled in the art. While the synergistic action is observed over a wide range of temperatures as hereinabove set forth, it is especially pronounced at temperatures high enough to produce a solution of the polymer, e.g., temperatures above 110° C.

The synergistic effect of the combined reducing agents employed in the catalyst of the present invention is independent of the monomer employed and increases the catalytic activity of the reduced polyvalent metal complex per se. Thus this surprising increase in activity and the increase of yield resulting from such activity will be found with all hydrocarbon monomers which can be polymerized by the coordination catalyst system and is in particular applicable to terminally unsaturated alkenes, and mixtures thereof, such as ethylene, propylene, butene-1, etc.

The present invention is of great value in the manufacture of linear, high density polyethylene and other high molecular weight hydrocarbon polymers since the increased activity of the catalyst is capable of polymerizing ethylenically unsaturated monomers to higher molecular weight and increased yield as compared to prior art methods.

I claim:

1. A catalyst composition consisting essentially of the product formed by admixing in the presence of an inert hydrocarbon solvent a titanium halide with reducing agents consisting of a combination of (1) an aluminum trihydrocarbon compound, wherein the hydrocarbon radical contains from 1 to 12 carbon atoms inclusive, and (2) a lead tetraalkyl wherein the alkyl radical contains from 2 to 5 carbon atoms inclusive, the molar ratio of said reducing agents to said titanium halide being from 0.3 to 10.

2. The composition as set forth in claim 1 wherein the aluminum trihydrocarbon compound is aluminum triisobutyl and the lead tetraalkyl is lead tetraethyl.

3. The composition as set forth in claim 1 wherein the aluminum trihydrocarbon compound is aluminum trisdihydromyrcenyl and the lead tetraalkyl is lead tetraethyl.

References Cited in the file of this patent

UNITED STATES PATENTS

| 2,721,189 | Anderson | Oct. 18, 1955 |
| 2,786,035 | Friemiller | Mar. 19, 1957 |

FOREIGN PATENTS

| 533,362 | Belgium | May 16, 1955 |
| 546,474 | Belgium | Mar. 27, 1956 |

UNITED STATES PATENT OFFICE
CERTIFICATE OF CORRECTION

Patent No. 2,992,190                  July 11, 1961

John MacMillan Bruce, Jr.

It is hereby certified that error appears in the above numbered patent requiring correction and that the said Letters Patent should read as corrected below.

Column 3, line 9, for "as" read -- at --.

Signed and sealed this 21st day of November 1961.

(SEAL)
Attest:

ERNEST W. SWIDER
Attesting Officer

DAVID L. LADD
Commissioner of Patents

USCOMM-DC